United States Patent
Anuskiewicz et al.

(10) Patent No.: US 10,702,883 B2
(45) Date of Patent: Jul. 7, 2020

(54) IRRIGATION SPRINKLER WITH REMOVABLY MOUNTED SOD CUP

(71) Applicant: Hunter Industries, Inc., San Marcos, CA (US)

(72) Inventors: Ronald H. Anuskiewicz, San Diego, CA (US); Richard M. Dunn, Carlsbad, CA (US); Revis R. Hunter, Vista, CA (US); Santo Uccello, San Marcos, CA (US)

(73) Assignee: Hunter Industries, Inc., San Marcos, CA (US)

( * ) Notice: Subject to any disclaimer, the term of this patent is extended or adjusted under 35 U.S.C. 154(b) by 174 days.

(21) Appl. No.: 15/945,505

(22) Filed: Apr. 4, 2018

(65) Prior Publication Data

US 2019/0308214 A1 Oct. 10, 2019

(51) Int. Cl.
| | | |
|---|---|---|
| *B05B 15/00* | (2018.01) | |
| *B05B 15/65* | (2018.01) | |
| *B05B 15/72* | (2018.01) | |
| *B05B 15/622* | (2018.01) | |
| *A01G 25/02* | (2006.01) | |

(52) U.S. Cl.
CPC ............ *B05B 15/65* (2018.02); *B05B 15/622* (2018.02); *B05B 15/72* (2018.02); *A01G 25/02* (2013.01)

(58) Field of Classification Search
CPC ........ A01G 9/02; A01G 20/00; B05B 15/662; B05B 15/16
USPC ...... 239/201, 203–206, 211, 288, 288.5, 289
See application file for complete search history.

(56) References Cited

U.S. PATENT DOCUMENTS

| | | | | |
|---|---|---|---|---|
| 3,709,435 A * | 1/1973 | Sheets | ..................... | B05B 15/70 239/206 |
| 4,014,502 A * | 3/1977 | Sheets | ..................... | B05B 15/70 239/206 |
| 4,429,832 A * | 2/1984 | Sheets | ..................... | B05B 15/74 239/204 |
| 4,752,033 A * | 6/1988 | Groendyke | ............. | B05B 15/70 239/288 |
| 5,137,307 A * | 8/1992 | Kinsey | ..................... | B05B 15/70 285/133.4 |
| 6,439,476 B1 * | 8/2002 | Boggs | ..................... | B05B 15/16 239/203 |
| 8,616,467 B1 * | 12/2013 | Leavitt | .................... | B05B 15/16 239/276 |
| 9,481,003 B2 * | 11/2016 | Clark | ..................... | B05B 15/70 |
| 10,314,245 B2 * | 6/2019 | Wright, III | ............. | B05B 15/16 |

(Continued)

*Primary Examiner* — Viet Le
(74) *Attorney, Agent, or Firm* — Knobbe Martens Olson & Bear LLP (57) ABSTRACT

An irrigation sprinkler can include an outer case having an inlet end and an outlet end. The sprinkler can include a riser positioned at least partially within the outer case and having an upstream end and a downstream end. The riser can be configured to transition between a retracted position and an extended position wherein the downstream end is positioned on a side of the outlet end of the outer case opposite the inlet end of the outer case when the riser is in the extended position. The sprinkler can include a cup assembly connected to the downstream end of the riser, the cup assembly including organic or artificial turf therein, wherein the cup assembly is configured to be removed from the riser without emptying the turf therefrom.

20 Claims, 10 Drawing Sheets

(56) References Cited

U.S. PATENT DOCUMENTS

2009/0090051 A1* 4/2009 Hogan ................. A01G 27/003
  47/66.6
2017/0223905 A1* 8/2017 Wright, III .............. B05B 15/16

* cited by examiner

IRRIGATION SPRINKLER WITH REMOVABLY MOUNTED SOD CUP

TECHNICAL FIELD

The present disclosure relates to sprinklers used in residential and commercial irrigation for watering turf and landscaping.

DISCUSSION OF THE RELATED ART

Many parts of the world lack sufficient rainfall at different times of the year to maintain the health of turf and landscaping. Irrigation systems are therefore used to deliver water to such vegetation from municipal water supplies and wells according to a watering schedule. Some typical irrigation systems comprise a programmable controller that turns valves ON and OFF to deliver water through a plurality of sprinklers connected to the valves via subterranean pipes. These sprinklers are sometimes rotor-type, impact, spray and/or rotary-stream sprinklers.

SUMMARY

According to some embodiments, an irrigation sprinkler can include an outer case and a riser extendible from the outer case by water pressure from a retracted position. A water inlet can be formed in the outer case for attachment to a water source. A nozzle can be mounted at an upper end of the riser. The nozzle can be configured to rotate with respect to one or more of the riser and the outer case. A pressure regulator may be mounted within the outer case between the water inlet and the riser. A sod cup can be removably installed on the top of the riser.

In some embodiments, the nozzle is rotatably mounted at the upper end of the riser. A turbine can be mounted in the riser for rotation by water entering a lower end of the riser. In some embodiments, a gear train reduction is mounted in the riser. A gear driven coupling mechanism can be mounted in the riser and can couple the gear train reduction and the nozzle. In some embodiments, an irrigation sprinkler can include an outer case having a case volume. The outer case can have a case inlet that can be coupled to a water supply. In some cases, the irrigation sprinkler includes a riser positioned at least partially within the case volume. The riser can have a riser inlet end having a riser inlet and a riser outlet end. In some embodiments, the riser includes an outlet housing. The outlet housing can be rotatably connected to the riser outlet end. In some embodiments, the riser includes a water outlet in the outlet housing. The riser can include a turbine mounted in the riser and rotatable by water entering the riser inlet. In some cases, a gear train reduction is mounted in the riser and operably coupled with the turbine and with the outlet housing. The irrigation sprinkler can include a sod cup. The sod cup can be removably mounted to the outlet housing and/or to the riser outlet end. In some embodiments, the sod cup is configured to accept soil and grass wherein the grass can grow in the sod cup. In some embodiments, artificial grass may be installed in the sod cup. In some embodiments, the sod cup can be removed from the outlet housing without removing the grass/soil from the sod cup. In some embodiments, the sod cup can be mounted to the outlet housing without removing the grass/soil from the sod cup. In some cases, the sod cup can be removed or installed by hand without requiring the use of any tools.

BRIEF DESCRIPTION OF THE DRAWINGS

Aspects of the present disclosure are described with reference to the accompanying drawings, in which like reference characters reference like elements, and wherein.

DETAILED DESCRIPTION

Generally described, the present disclosure relates to sprinklers. Irrigation sprinklers can be used to distribute water to turf and other landscaping. Types of irrigations sprinklers include pop-up, rotor-type, impact, spray and/or rotary-stream sprinklers. In some applications, an irrigation system can include multiple irrigation sprinklers used to water a targeted area. One or more controllers (e.g., wireless and/or wired controllers) can be used to control the operation of multiple irrigation sprinklers. For example, one or more controllers can control when each of the sprinklers of the irrigation system transitions between an irrigating (e.g., ON) configuration and a non-irrigating (e.g., OFF) configuration. In some embodiments, the one or more controllers control the amount of water distributed by the sprinklers. The water source for the irrigation system can be provided by a single water source, such as a well, a body of water, or water utility system. In some applications, multiple water sources are used.

Sprinklers are often installed in the grass in parks and playing fields. In some instances, it is preferable to keep those sprinklers out of site and hidden in the grass (e.g., when the sprinklers are in a retracted or inactive configuration). In these cases, there may be a cup mounted on the top of the sprinkler to allow a user to grow grass on the top of the sprinkler. When the grass area is mowed, the grass growing in the cup on the top of the sprinkle is mowed as part of the larger grass area and the sprinkler location is hidden from view. In some instances, artificial turf may be placed in the cup and may be installed in the location rather than grass. In this instance, the sprinkler may have a plug of artificial turf installed in the cup and it may be positioned so that when the sprinkler is retracted, the piece of artificial turf in the cup blends with the artificial turf installed at the field and the location of the sprinkler is not easily identified, In some instances, a sod cup is used to reduce injury to people on the field where an athlete, or other individual, may be injured if they were to trip on, or fall onto an exposed sprinkler head.

Figure 1:
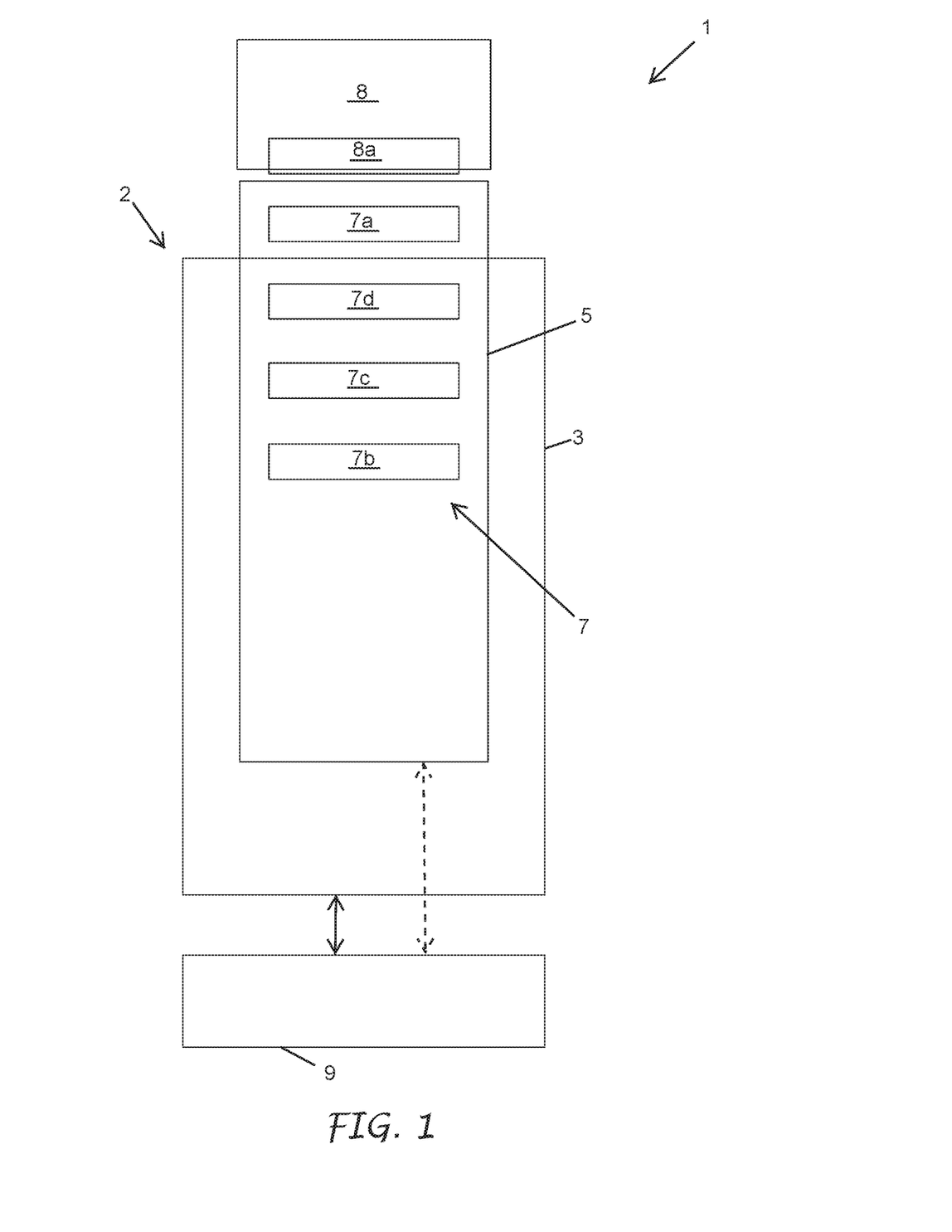
FIG. 1 is a schematic illustration of an irrigation system.

As schematically illustrated in FIG. 1, an irrigation sprinkler 1 can include an outer case 3. The outer case 3 can have a generally cylindrical shape or some other appropriate shape. A riser 5 can be positioned at least partially within the outer case 3. In some embodiments, such as pop-up sprinklers, the riser 5 is biased to a contracted or non-irrigating position within the outer case 3. The riser 5 may be biased to the contracted position by gravity and/or biasing structures such as springs. In some embodiments, the riser 5 transitions to an extended or irrigating position when pressure (e.g., water pressure) within the outer case 3 is high enough to overcome a biasing force on the riser 5. In some embodiments (e.g., non-pop-up sprinklers) the riser 5 is fixed in the extended position.

One or more mechanical components 7 can be positioned within the riser 5 and/or within the outer case 3. For example, the riser 5 can include an outlet 7a (e.g., a nozzle or outlet port). In some embodiments, the sprinkler 1 includes a plurality of outlets. For example, the sprinkler 1 can include one or more primary outlet nozzles with a first flow rate and one or more secondary outlet nozzles with at least a second flow rate. The outlet 7a can direct water from the irrigation sprinkler 1 when the sprinkler 1 is ON. In some embodiments, the outlet 7a is connected to an outlet housing (e.g., a nozzle turret). The outlet housing and/or outlet 7a can be rotatable or otherwise moveable with respect to the riser 5 and/or outer case 3.

In some embodiments, the irrigation sprinkler 1 includes a turbine 7b. The turbine 7b can rotate in response to water entering an inlet end of the riser 5 and/or the outer case 3. The turbine 7b can be configured to rotate the outlet 7a. In some embodiments, a gear train reduction 7c is connected to the turbine 7b via an input shaft or otherwise. The gear train reduction 7c can transfer torque from the rotating turbine 7b to the outlet housing and/or outlet 7a via an output shaft, output clutch, or other output structure.

The sprinkler 1 can include a reversing mechanism 7d. The reversing mechanism 7d can be positioned within the riser 5 and/or within the outer case 3. In some embodiments, the reversing mechanism 7d is connected to the gear train reduction 7c and/or to the outlet 7a. The reversing mechanism 7d can be used to reverse the direction of rotation of the outlet 7a. In some embodiments, the reversing mechanism 7d reverses the direction of rotation of the outlet 7a without changing the direction of rotation of the turbine 7b. In some embodiments, the reversing mechanism 7d reverses the direction of rotation of the outlet 7a by reversing the direction of rotation of the turbine 7b.

In some embodiments, the reversing mechanism 7d reverses the direction of rotation of the outlet 7a via manual input. For example, a tool may be used to adjust the reversing mechanism 7d to reverse the direction of rotation of the outlet 7a. In some applications, the reversing mechanism 7d can be adjusted without requiring use of tools (e.g., with just a user's hand) to reverse the direction of rotation of the outlet 7a. In some embodiments, the reversing mechanism 7d reverses the direction of rotation of the outlet 7a automatically via selected arc limiters.

Water may be provided to the sprinkler 1 via one or more water sources 9. The water source 9 may be fluidly connected to the outer case 3 and/or to the riser 5. In some embodiments, fluid communication between the water source 9 and the sprinkler 1 is controlled by one or more controllers, valves, or other apparatuses.

In some embodiments, a sod cup 8 can be removably mounted to the top of the riser 2, the top of the outlet 7a, and/or to the outlet housing. An adapter 8a may be attached to the riser 2, the top of the outlet 7a, and/or to the outlet housing and the sod cup may be removably attached to the adapter 8a.

Figure 2:
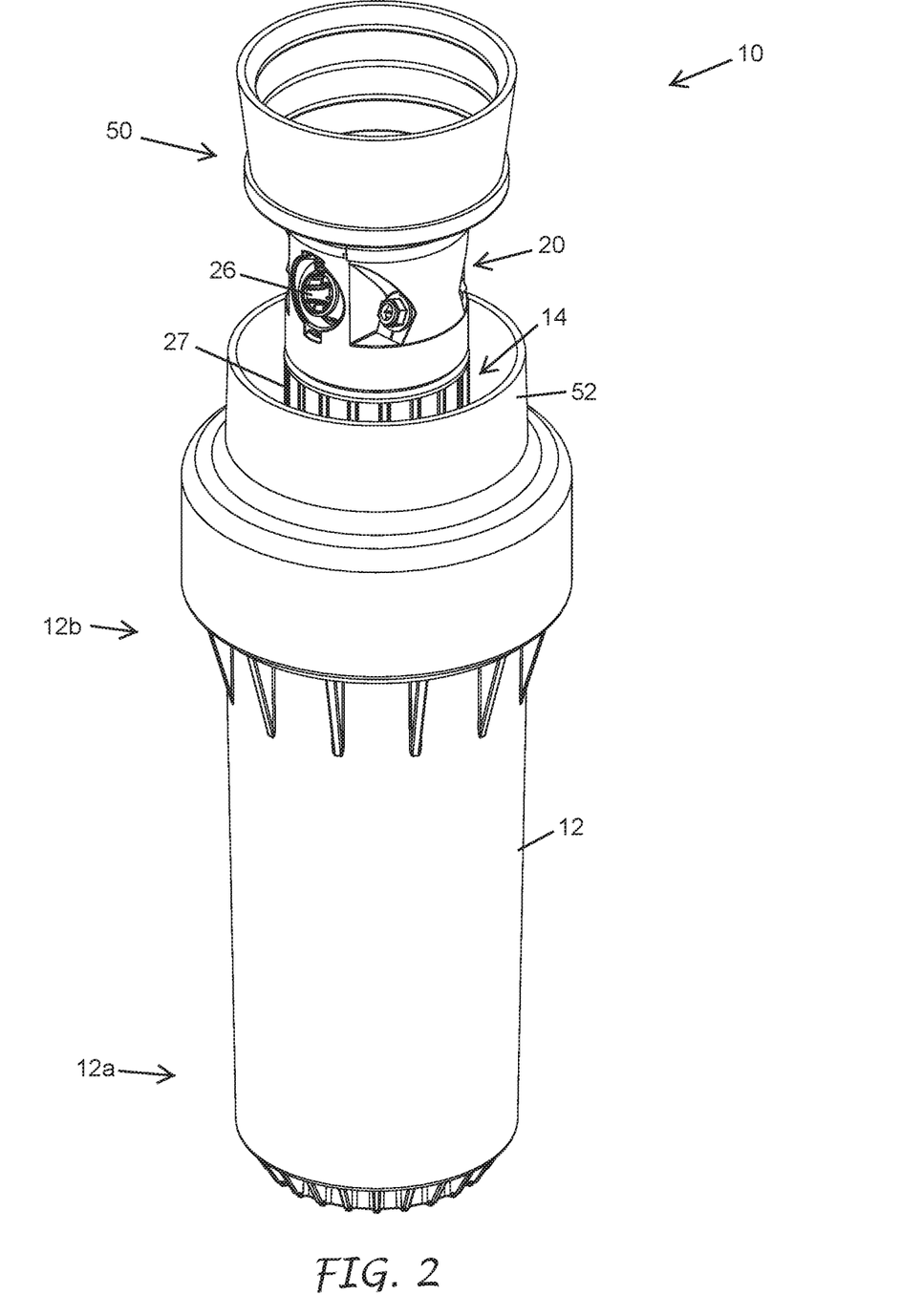
FIG. 2 is a view of an embodiment of a sprinkler with the riser extended.
Figure 3:
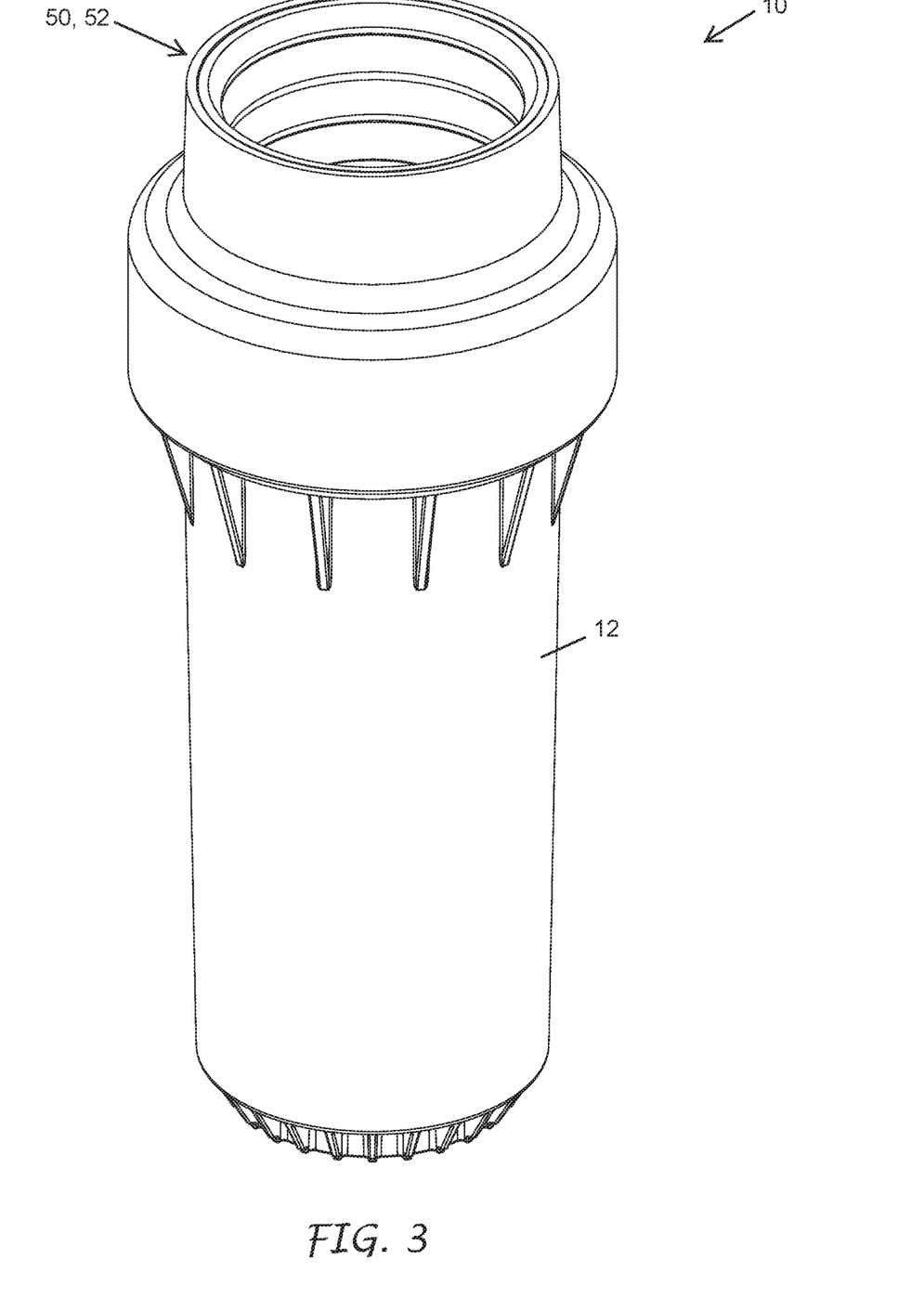
FIG. 3 is a view of an embodiment of the sprinkler of FIG. 2 with the riser retracted.
Figure 4:
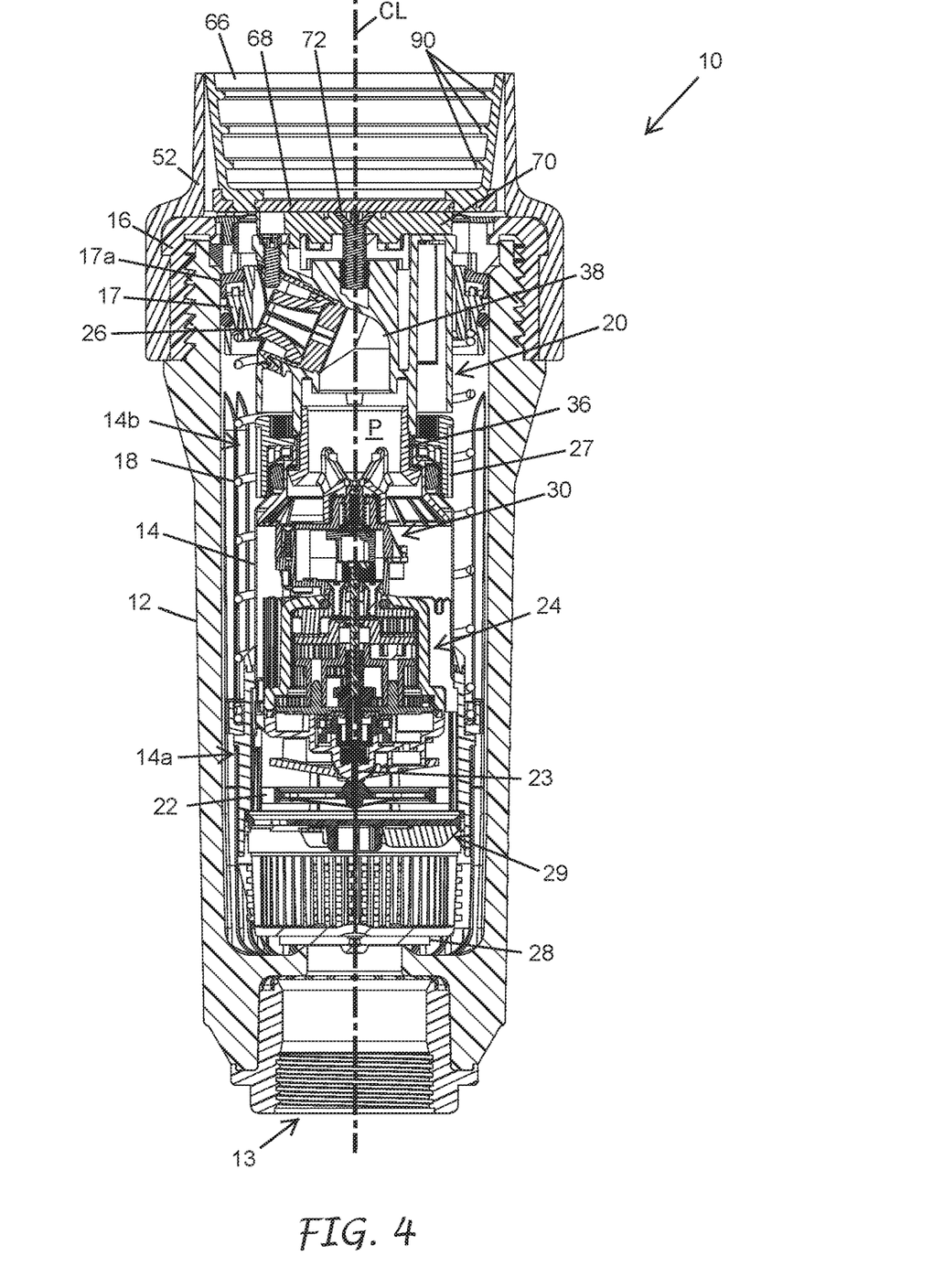
FIG. 4 is a vertical cross-sectional view of the sprinkler of FIG. 3.

Referring to FIGS. 2-4, a sprinkler 10 according to certain embodiments is shown. As will be understood, the sprinkler 10 can include main components such as those shown above. Namely, an outer case, a riser, an outlet, a turbine, a gear train reduction, and/or a reversing mechanism. In some embodiments, the sprinkler 10 includes a pressure regulator. As will be described in more detail below, the sprinkler 10 can also include a detachable sod cup. The sod cup may facilitate growing grass on the top of the sprinkler. In some instances, artificial grass may be placed in the sod cup. Certain of the illustrated features of the sprinkler will now be described, though they may not be part of all embodiments.

In some embodiments, the sprinkler 10 includes a cylindrical outer case 12 having a first end 12a and a second 12b. In some embodiments, the sprinkler 10 includes a tubular riser 14 telescopically extendible from the outer case 12 through the second end 12b of the outer case 12 between a retracted position (e.g., see FIG. 3) and an extended position (e.g., see FIG. 2). For example, the riser 14 can be housed at least partially within an interior of the outer case 12 and can be extended outward from the outer case 12 by water pressure. The riser 14 can have a first end 14a and a second end 14b and can be mounted co-axially with the case 12 (see, e.g., FIG. 4). The riser 14 can reciprocate along its central longitudinal axis CL with respect to the outer case 12. A cap 16 can be coupled with the second end 12b of the outer case 12. Coupling between the cap 16 and the outer case 12 can be releasable (e.g., a detent coupling, bayonet coupling, high-friction coupling, threaded coupling, and/or a clip). For example, the cap 16 can have internal female threads which engage with external male threads on the second end 12b of the outer case. The cap 16 can inhibit or prevent the riser 14 from de-coupling from the case 12, as further explained below. In some embodiments, the cap 16 is constructed from a plurality of materials. For example, the threaded portion of the cap can be a rigid portion and the cap can include a pliable and/or elastomeric sleeve that extends in an axial direction above the top of the rigid portion of the cap as further explained below.

In some embodiments, the sprinkler 10 includes a water outlet assembly 20 (e.g., a nozzle turret) mounted to the riser 14 at or near the second end 14b of the riser 14. The water outlet assembly 20 can be stationary (e.g., rotationally fixed) with respect to the riser 14 and/or the outer case 12. In some embodiments, the water outlet assembly 20 is rotatable with respect to the riser 14 and/or the outer case. The water outlet assembly 20 can include one or more nozzles as disclosed in U.S. Pat. No. 8,727,268 of Clark et. al., granted on May 20, 2014, and U.S. Pat. No. D593,182 of Anuskiewicz, granted on May 26, 2009, each of which is incorporated by reference herein in their entirety. For example, the water outlet assembly 20 can include one or more bent, primary, and/or secondary nozzles as disclosed in U.S. Pat. No. 8,936,205 of Dunn et. al., granted on Jan. 20, 2015, and U.S. Pat. No. 9,914,143 of Clark et. al., granted on Mar. 13, 2018, each of which is incorporated by reference herein in their entirety. The sprinkler 10 can include a turbine 22 mounted in the riser 14 and/or in the outer case 12 and rotatable in response to water flow through the sprinkler 10. The turbine 22 can be operably coupled to the water outlet assembly 20 to rotate the water outlet assembly 20 (e.g., about the longitudinal axis CL of the riser 14).

As illustrated in FIG. 4, the sprinkler 10 can include a gear train reduction 24 operably coupled to the turbine 22 and to the water outlet assembly 20. The gear train reduction 24 can transfer torque between the turbine 22 and the water outlet assembly 20. In some embodiments, the sprinkler 10 includes a reversing mechanism 30 mounted in the riser 14 and/or in the outer case 12 to reverse a direction of rotation of the water outlet assembly 20 with respect to the riser 14. Example gear train reductions are illustrated and described in U.S. Pat. No. 8,474,733 of Clark et al., granted on Feb. 17, 2013, and U.S. patent application Ser. No. 14/971,620 of Bell, filed on Dec. 16, 2015, each of which is incorporated by reference herein in its entirety.

In some embodiments, the sprinkler 10 includes a check valve 28 mounted in the riser 14 and/or in the outer case 12. The check valve 28 can be mounted in a fluid path between an inlet of the sprinkler 10 and an outlet (e.g., the water outlet assembly 20) of the sprinkler 10. The check valve 28 can inhibit or prevent low pressure water from passing through an outlet of the sprinkler 10 when the riser 14 is in a retracted position.

The case 12 can include an inlet 13 at or near the first end 12 of the outer case 12. The inlet 13 can coupled with a source of pressurized water. For example, the inlet 13 can have a threaded fitting (e.g., a female threaded inlet having internal threading extending into an interior of the case 12) or some other releasably fitting configured to connect to a threaded fitting on a pipe or other water-carrying structure. The water-carrying structure can be connected to a source of pressurized water such as a solenoid-actuated valve (not illustrated). See, e.g., U.S. Pat. No. 5,979,863 granted Nov. 9, 1999 to Bradley M. Lousberg, the entire disclosure of which is hereby incorporated by reference herein.

The riser 14 can telescope parallel to the longitudinal axis CL through the end cap 16 to an extended position (e.g., see FIG. 2) when water pressure is applied at the inlet 13. In some embodiments, the sprinkler 10 includes a biasing structure configured to bias the riser 14 to a retracted position. For example, a spring 18 can be positioned within the case 12. One end of the spring 18 can be braced with respect to or against the outer case 12 (e.g., near the second end 12b of the outer case 12) in a direction parallel to the longitudinal axis CL of the riser 14. For example, one end of the spring 18 can seat against a rigid retainer ring 17 held in place with respect to the outer case 12 by the end cap 16. In some embodiments, the end of the spring 18 seats in a downwardly opening annular groove in the retainer ring 17. Another end of the spring 18 can be braced against the riser 14 (e.g., near the first end of 14a of the riser) in a direction parallel to the longitudinal axis CL of the riser 14. For example, an end of the spring can seat in an upwardly opening annular groove formed in a shoulder at or near the first end 14a of the riser 14.

Extension of the riser 14 to an extended position can compress the spring 18. In some embodiments, interference between the end cap 16 and the spring 18 or first end 14a of the riser 14 can inhibit or prevent the riser 14 from exiting the outer case 12 when the riser 14 transitions to the extended position. When the water pressure is turned OFF the biasing force of the compressed spring 18 can push the riser 14 back to its retracted position illustrated in FIG. 3. In some embodiments, an elastomeric seal 17a is positioned between the riser 14, the retainer ring 17, and the case 12. The wiper seal 17a can prevent pressurized water inside the case 12 from leaking out.

In some embodiments, as illustrated in FIGS. 2 and 4, the water outlet assembly 20 can include one or more ports or nozzles 26. In some embodiments, the one or more nozzles 26 are removably mounted in the water outlet assembly 20.

As illustrated in FIG. 4, the turbine 22 can be mounted to an input shaft 23 of a staggered gear train reduction 24 mounted in the riser 14. In some instances, the gear train can be a planetary gear train. In some cases, the gear train can be a combination of a staggered gear train and a planetary gear train. An arc-adjustable reversing mechanism 30 can be mounted in the riser 14 and can couple an output of the gear train reduction 24 and the water output assembly 20. The reversing mechanism 30 is one form of a gear driven coupling mechanism that can allow the gear train reduction 24 to adjust the mode of operation of the sprinkler 10 from the side of the riser so that it will rotate the water output assembly 20 back and forth between selected arc limits to provide an oscillating sprinkler or rotate the water output assembly 20 in a continuous uni-directional manner. In some embodiments, a gear driven coupling can be used to rotate the water output assembly 20 in only an oscillating manner. In some embodiments, a gear driven coupling can be used to rotate the water output assembly 20 in only a continuous uni-directional manner. A stator 29 can be mounted at or near the first end 14a of the riser 14 upstream of the turbine 22 for controlling the RPM of the turbine 22. In some embodiments, the stator 29 may be a spring biased stator.

The reversing mechanism 30 is preferably of the type disclosed in U.S. Pat. No. 8,955,768 granted Feb. 17, 2015 to Michael L. Clark, et al. The entire disclosure of said U.S. Pat. No. 8,955,768 is hereby incorporated by reference. In some embodiments, the reversing mechanism is of one or more of the types of reversing mechanisms disclosed in U.S. Pat. No. 7,287,711 granted Oct. 30, 2007 to John D. Crooks and U.S. Pat. Nos. 3,107,056; 4,568,024; 4,624,412; 4,718,605; and 4,948,052, all granted to Edwin J. Hunter, the entire disclosures of which are also hereby incorporated by reference. As explained in U.S. Pat. No. 8,955,768, an output motion of the gear train reduction 24 can drive a reversing mechanism that moves an internal shaft in an axial direction to alternately engage different planetary gears inside of the gear box 24 to drive the output a first direction and a second, opposite direction. The reversing mechanism 30 can allow a user to set the desired size of the arc of oscillation of the nozzle 26 from the side of the riser 14. This can be done, for example, by rotating an arc adjusting ring 27 on the upper end of the riser to change the location of a movable arc adjustment tab (not illustrated) relative to a fixed arc adjustment tab (not illustrated). In some embodiments, the arc adjustment can be made from the top side of the turret 20. This can be done, for example, by engaging a manual tool (not illustrated) with a slotted upper end of an arc adjustment shaft (not illustrated) that is accessible near the top surface of the turret 20 and twisting the shaft to change the location of a movable arc adjustment tab (not illustrated) relative to a fixed arc adjustment tab (not illustrated). Optionally, maintenance personnel can convert the sprinkler 10 to a uni-directional mode in which allows full circle rotation of the nozzle 26. This can be done, for example, by manually twisting the arc adjusting shaft, or the arc adjusting ring 27, until the arc adjustment tabs stop in the 360-degree rotation location. Alternately, the reversing mechanism 30 may be built to only allow continuous rotation by not installing specific components during manufacturing, in which case the remaining components may function as a non-reversing gear driven coupling mechanism between the gear train reduction 24 and the nozzle 26.

As illustrated in FIG. 4, a vertically extending cylindrical coupling stem 36 can be rotationally coupled in a concentric fashion with the output drive of the gearbox 24 and can provide a hollow tubular drive shaft that couples to the water output assembly 20. The upper end of the coupling stem 36 can be securely bonded in a cylindrical sleeve of the water output assembly 20. The water output assembly 20 and the nozzle 26 inserted therein thus can be supported for rotation relative to the riser 14 and the case 12 by the coupling stem 36. An upper end of the coupling stem 36 can terminate at or near a lower segment of a dog-legged tubular structure 38 formed in the water output assembly 20. The lower segment of the tubular structure 38 can be cylindrical and centered axially in the water output assembly 20. The nozzle 26 can be inserted into the upper inclined, radially extending segment of the tubular structure 38. The interior of the coupling stem 36 may provide a relatively large central passage P that can convey water to the nozzle 26.

Referring back to FIG. 2, the sprinkler 10 can include a structure configured to disguise the location of the sprinkler 10 when the riser is in the retracted position. In some applications this structure can reduce the risk of injury to persons walking, running, playing sports, or otherwise using the area in which the sprinkler 10 is installed. The structure can include a cup assembly 50. The cup assembly 50 can be configured to receive sod, soil, artificial turf, flowers, or other organic or artificial content to blend in with the surrounding environment. In some embodiments, the cup assembly 50 includes permanently-attached artificial sod or other artificial content. In some such embodiments, the cup assembly 50 may not include a hollow cup. Instead, the cup assembly 50 may include a solid structure with artificial turf or other plant replicas on a top surface of the structure.

In some applications, it may be desirable to have a sleeve or other protective structure configured to reduce the likelihood of impact on the cup assembly 50 by a person, mower, wheel, ball, or other object. In some applications the protective structure may be at least partially buried in the surrounding landscape and the protective structure can prevent soil from moving near the riser when the riser is extended. For example, the protective structure may be configured to surround at least a portion of the cup assembly 50 when the riser 14 is in the retracted position. In some embodiments, the protective structure maybe formed of a rigid or semi rigid material, such as a plastic material. The protective structure can be a sleeve 52 that extends upward from the case 12 and/or from the end cap 16. The sleeve 52 can be constructed from a resilient and/or flexible material configured to flex and/or compress upon impact from foreign object and to return to its original form. Example flexible materials include elastomers, urethane elastomers, and polyolefin elastomers. In some embodiments, the materials used for the sleeve 52 can have a hardness of less than 95 Shore A or 45 Shore D.

Figure 5:
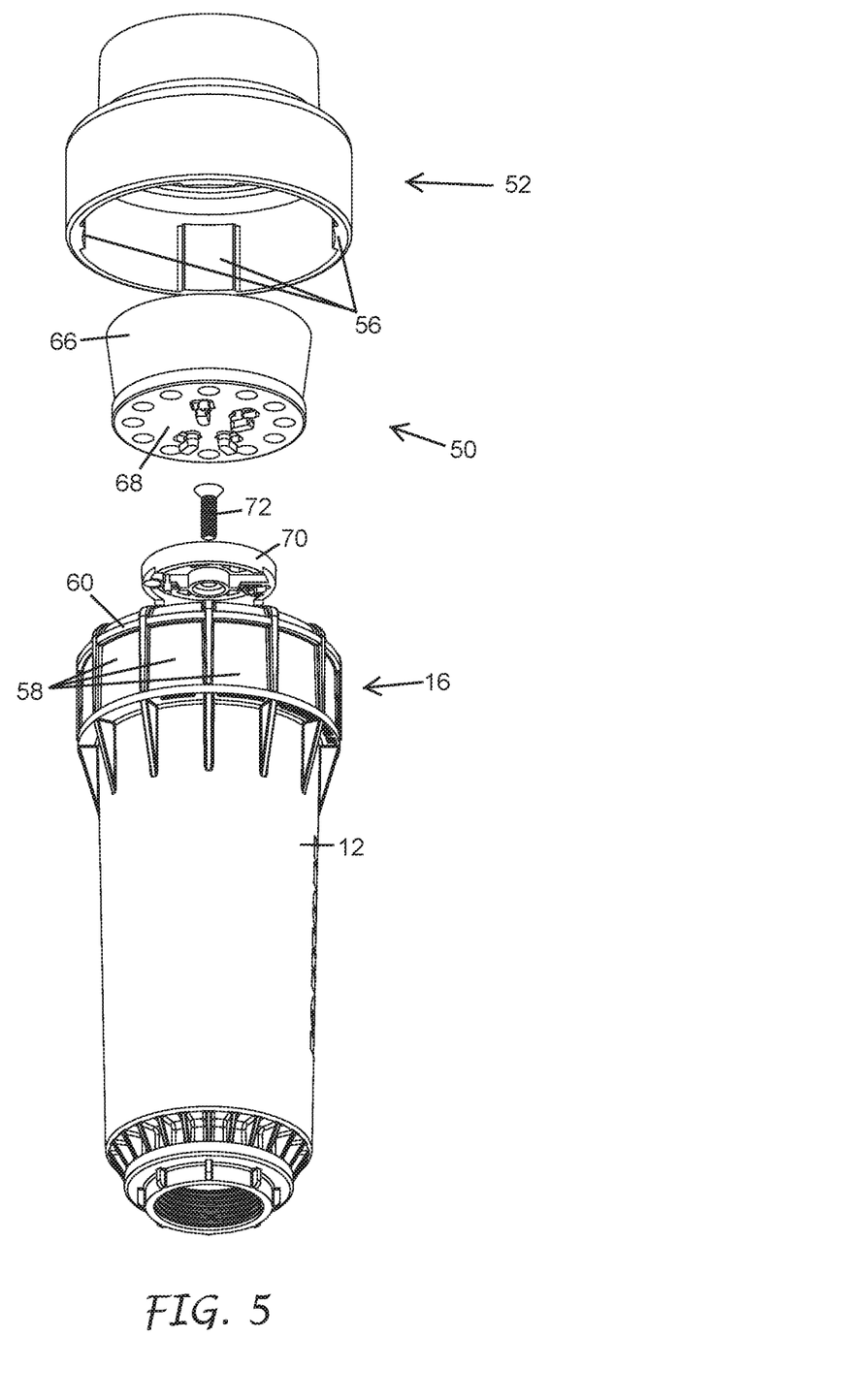
FIG. 5 is a bottom perspective exploded view of a sod cup on the sprinkler of FIG. 3.

In some embodiments, as illustrated in FIGS. 2-4, the sleeve 52 is fixed to the end cap 16. For example, as illustrated in FIG. 5, the sleeve 52 can include internal engagement features configured to engage with a portion of the end cap 16. The internal engagement features can include threads, bayonet fittings, high-friction surfaces, detent structures, or other permanent or releasable structures configured to engage with complimentary structure on the end cap 16 or another portion of the sprinkler 10. For example, the internal engagement features can be internal projections 56. The projections 56 can be configured to engage with recesses 58 on an outer surface of the end cap 16. The end cap 16 can include ridges 60 or other structures configured to inhibit or prevent inadvertent removal of the sleeve 52 from the end cap 16. For example, interference between the projections 56 and the ridges 60 and inhibit the end cap 16 from detaching from the end cap 16 without radial flexing of the sleeve 52 with respect to the end cap 16. In some embodiments, the sleeve 52 and end cap 16 are co-molded or otherwise manufactured as a single piece from one or more materials.

Figure 6:
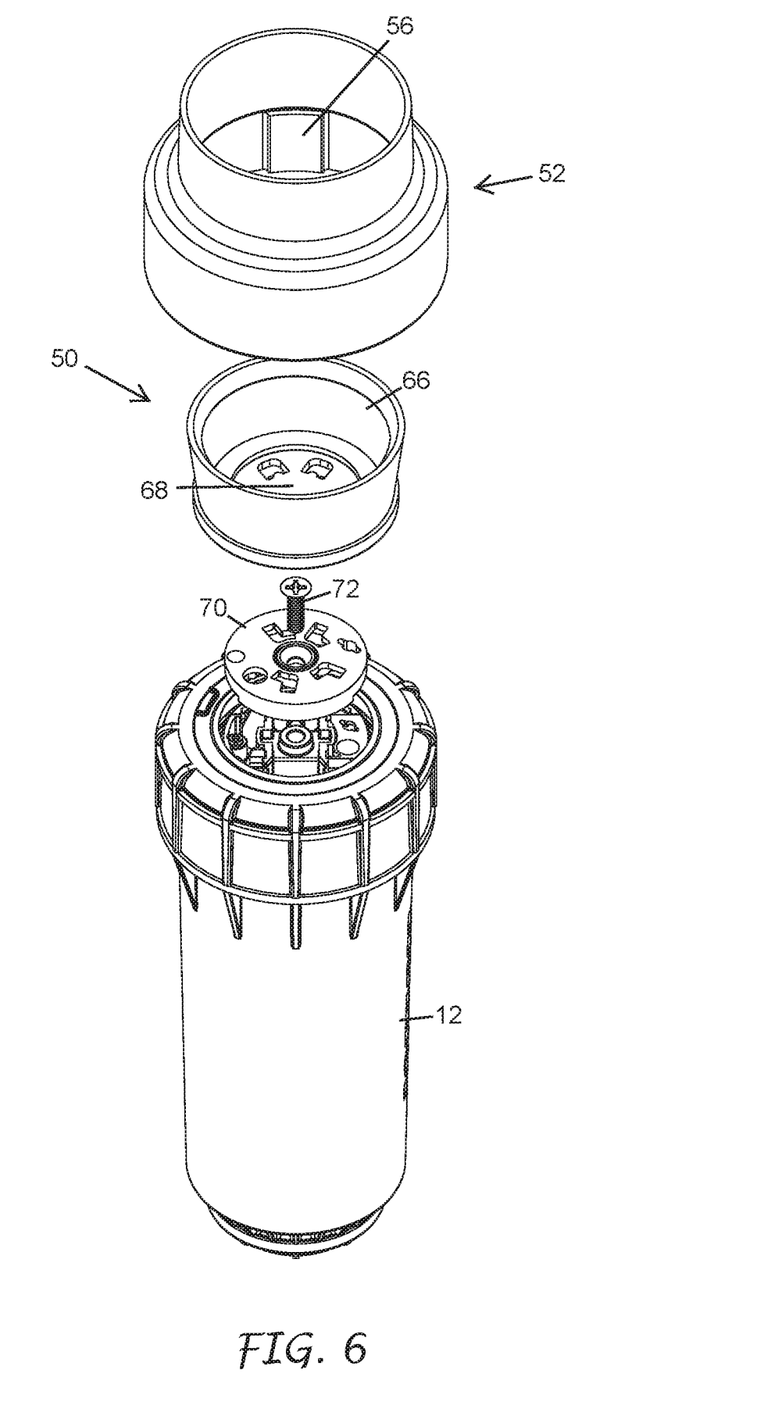
FIG. 6 is a top perspective exploded view of the sod cup of FIG. 5.

As illustrated in FIGS. 5-6, the cup assembly 50 can include a cup portion 66 and a cup base portion 68. The cup portion 66 can extend from the cup base portion 68 in a direction opposite the riser. In some embodiments, the cup portion 66 (e.g., skirt) can be formed as a monolithic part with the cup base portion 68. In some embodiments, the cup portion 66 is co-molded or otherwise connected to the cup base portion 68. The cup portion 66 can be constructed from a flexible and/or resilient material. In some embodiments, the cup base portion 68 is constructed from a rigid or semi-rigid material. A rigid or semi rigid plastic is a plastic that will maintain its original shape with normal handling. Although a rigid or semirigid plastic may have some level of flexibility, this is typically obtained using forces that are greater than seen in normal usage. A rigid or semi rigid plastic will flex under high pressure and break after a certain deflection point. A rigid plastic will typically break or permanently deform soon after its initial deflection pressure. A semi rigid plastic will typically deflect further and easier before it is permanently deformed or breaks. Typical rigid plastics may include phenolic, nylon polypropylene polycarbonate and PVC. Examples of uses of rigid plastics may include plastic actuators in switches, or a plastic tray or seat back, engine components or covers, and handles for doors, luggage and appliances. Examples of uses of semi rigid plastics may include automotive bumper covers or disposable packaging. Flexible plastics, on the other hand, can be easily deformed (e.g., elastically deformed) a significant amount and return to their original shape without breaking. A flexible plastic will typically be an elastomer with very flexible or elastic properties. Some types of thermoplastic elastomers include polyolefin, and polyurethanes. Uses of elastomers may include seals, such as surrounding a refrigerator door, a wet suit, and weather-stripping. Flexible materials and elastomers usually have a high elasticity and/or high stretchability. In some embodiments, the cup portion 66 is constructed from the same material as the sleeve 52. Constructing the cup portion 66 from a flexible and/or resilient material can reduce the risk of injury to persons from contact with the cup portion 66.

In some embodiments, the cup assembly 50 is configured to connected directly to a portion of the sprinkler 10. For example, the cup assembly 50 can be configured to connect to the riser 14, to the nozzle turret 20, and/or to some other portion of the sprinkler 10. The connection between the cup assembly 50 and the sprinkler 10 can be releasable with or without the use of tools. In some embodiments, the cup assembly 50 connects to the sprinkler 10 via one or more of a bayonet fitting, threaded fitting, frictional fitting, detent fitting, fastener(s), and/or other releasable connection structures or methods.

In some embodiments, as illustrated in FIGS. 5-6, the sprinkler 10 can include an adapter 70. The adapter 70 can be configured to facilitate connection between the sod cup assembly 50 and the riser 14 or nozzle turret 20. In some embodiments, the adapter 70 is configured to releasably connect to the nozzle turret 20 or riser 14. For example, an adapter fastener 72 may be used to connect the adapter 70 to another portion of the sprinkler. In some embodiments, the adapter 70 includes a threaded portion or other portion configured to mate with the nozzle turret 20 or riser 14 without use of a separate fastener.

Figure 7:
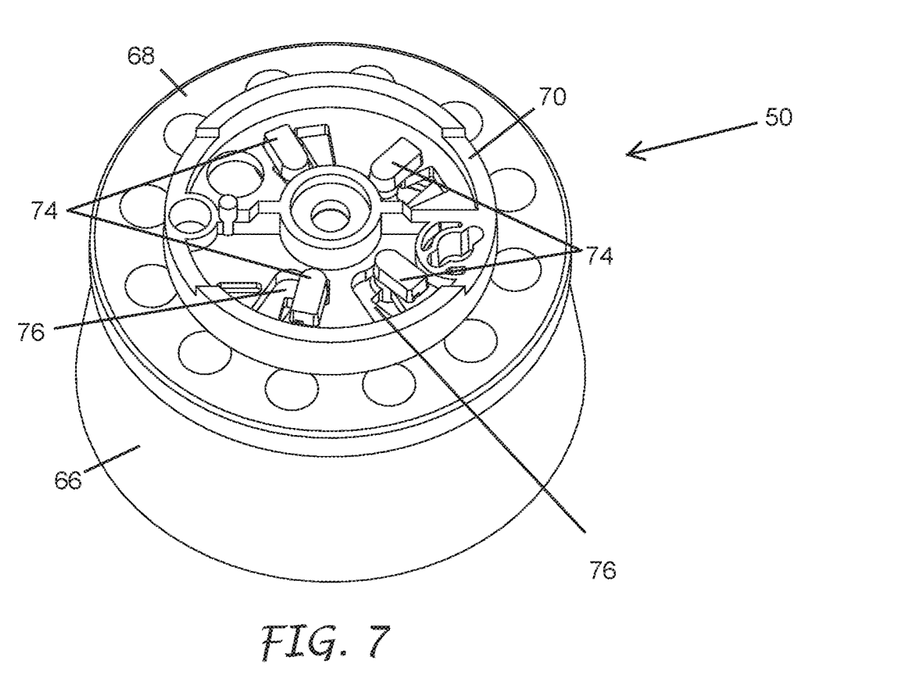
FIG. 7 is a bottom view of the sod cup of FIG. 5 mounted to an adapter plate.
Figure 8:
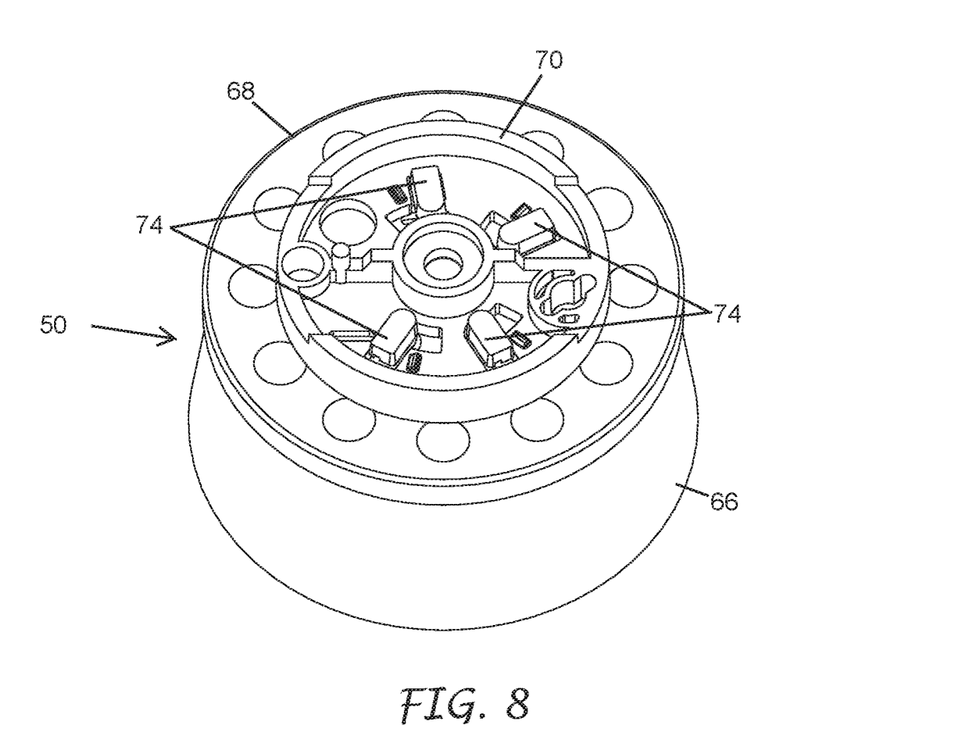
FIG. 8 is a bottom view of a sod cup mounted aligned with the adapter plate of FIG. 7, but not locked together.

As illustrated in FIGS. 7-8, the cup assembly 50 can be engaged with the adapter 70. For example, the cup assembly 50 (e.g., the cup base portion 68) can include one or more engagement features configured to engage (e.g., releasably) with one or more engagement features of the adapter 70. In the illustrated embodiment, the cup assembly 50 includes a plurality of protrusions or lock arms 74 configured to engage with the adapter 70. The lock arms 74 can be inserted through lock apertures 76 in the adapter 70. Once the lock arms 74 are inserted through the lock aperture 76, the cup base portion 68 can be rotated to transition the cup assembly 50 to a locked configuration with respect to the adapter 70 (FIG. 7).

Figure 11:
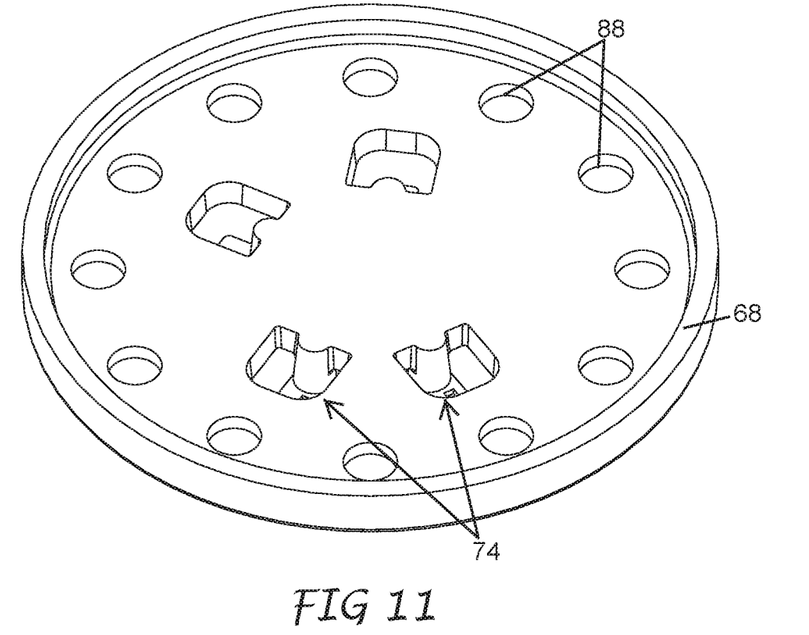
FIG. 11 is a top perspective detail view of the base of the sod cup base of FIG. 9.
Figure 12:
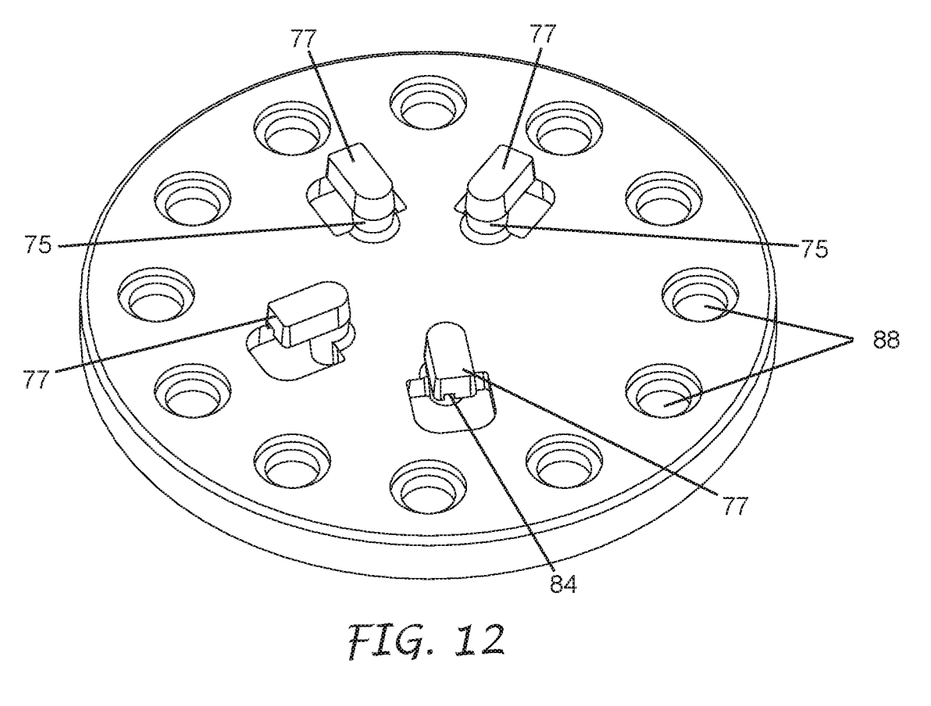
FIG. 12 is a bottom perspective detail view of the base of the sod cup base of FIG. 11.

As illustrated in FIGS. 11-12, the lock arms 74 can include an arm base 75 and an arm extension 77. The arm base 75 can extend from the cup base portion 68 and the arm extension 77 can extend from the arm base 75. In some embodiments, the arm extension 77 extends from the arm base 75 in a direction parallel to or substantially parallel to the plane of the cup base portion 68.

Figure 13:
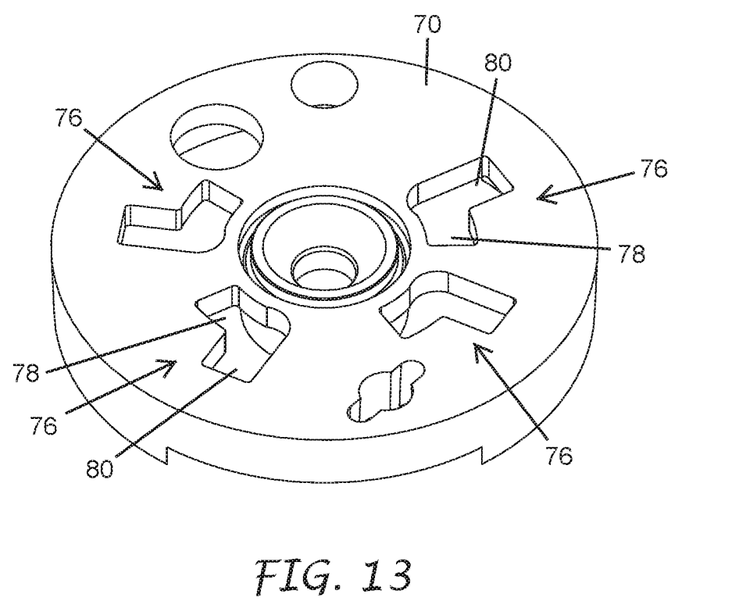
FIG. 13 is a top perspective detail view of the nozzle turret adapter plate of FIG. 7.
Figure 14:
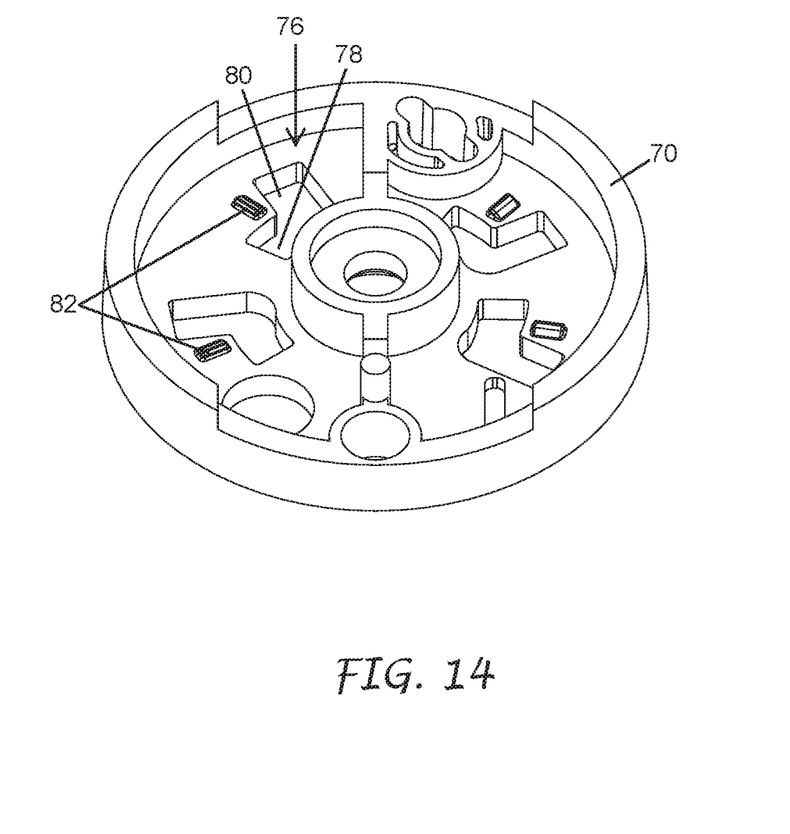
FIG. 14 is a bottom perspective detail view of the nozzle turret adapter plate of FIG. 13.

As illustrated in FIGS. 13-14, the lock apertures 76 include an insertion portion 80 configured to receive the lock arms 74 when the lock arms 74 are initially inserted through the lock apertures 76. The apertures 76 can include a secondary channel 78 configured to receive the arm base 75 as the cup base portion 68 is rotated with respect to the adapter 70. The apertures 76 can have a general "L" shape such that, upon rotation of the cup base portion 68 with respect to the adapter 70 after insertion of the lock arms 74 through the apertures 76, portions of the adapter 70 adjacent the insertion portions 80 can interfere with the lock arms 74 (e.g., the arm extensions 77) to inhibit accidental detachment of the cup base portion 68 from the adapter 70. In some embodiments, the adapter 70 includes one or more protrusions 82 configured to interact with the arm extensions 77 when the cup base portion 68 is in the locked configuration. The protrusions 82 can, for example, operate as detents that engage with indentations 84 (FIG. 12) in the arm extensions 77. Engagement between the protrusions 82 and the lock arms 74 can increase the amount of torque required to rotate the cup base portion 68 away from locked configuration to release the cup base portion 68 from the adapter 70. In some embodiments, the locking features of the adaptor 70 can be incorporated into the top of the water outlet assembly 20 and the adaptor 70 is not required.

Returning to FIGS. 11-12, the cup base portion 68 can include one or more apertures 80. The apertures 80 can be distributed in a pattern at or near the outer perimeter of the cup base portion 68. In some embodiments, the apertures 80 are configured to receive a flow of material as the cup portion 66 is co-molded with the cup base portion 68. In some embodiments, the apertures 80 are configured to receive fasteners to attach the cup base portion 68 to the cup portion 66.

Figure 9:
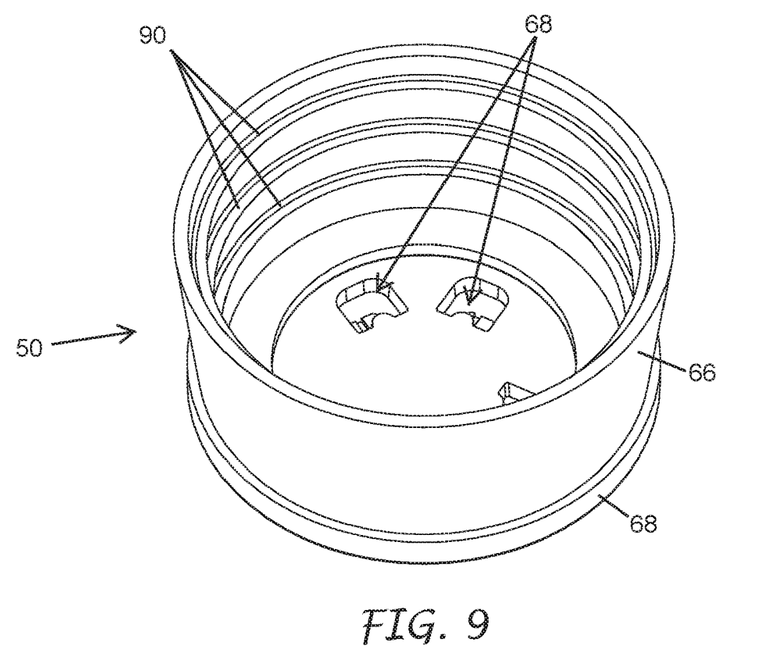
FIG. 9 is a top perspective view of the sod cup of FIG. 5.
Figure 10:
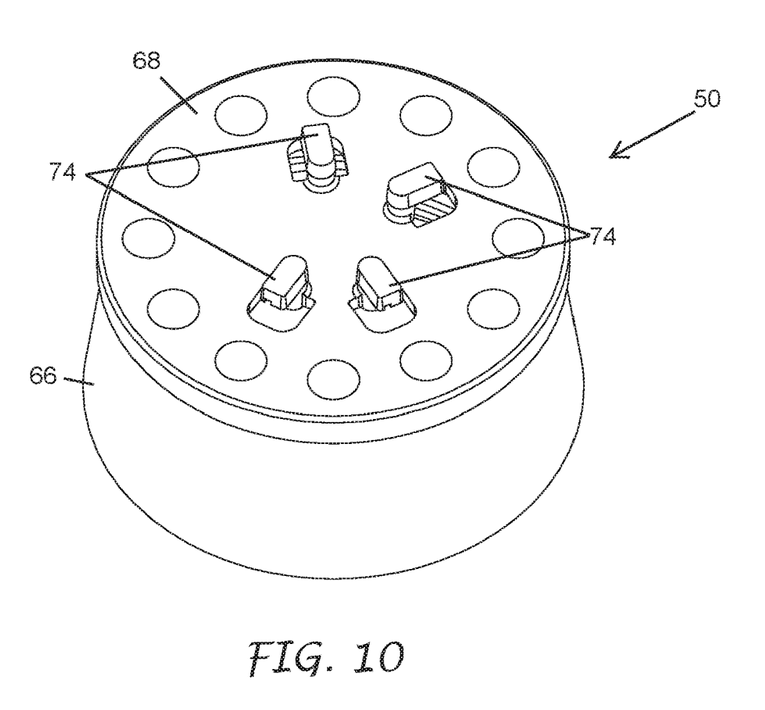
FIG. 10 is a bottom perspective view of the sod cup of FIG. 9.

In some embodiments, as illustrated in FIGS. 4 and 9, the cup portion 66 includes one or more features configured to reduce the likelihood of accidentally emptying of soil or other material from the cup portion 66. For example, the cup portion 66 can include internal ridges or ribs 90 configured to reduce the likelihood of accidentally emptying the cup portion 66 during normal operation or maintenance of the sprinkler 10. The ribs 90 can be annular. In some embodiments, the ribs 90 are formed in multiple rows. The ribs 90 can be formed in a staggered pattern, such as a brick-laying pattern. In some embodiments, the ribs 90 can be a continuous helix (i.e., an internal thread). The ribs 90 can be intermittent or segmented and not fill the entire three-hundred-and-sixty-degree circumference.

Utilizing the sprinkler embodiments described herein can realize a number of advantages. These advantages include the ability to perform maintenance on the sprinkler without emptying the cup portion 66. For example, the cup assembly 50 can be removed in its entirety from the sprinkler without emptying the cup portion 66. Such configurations can greatly reduce cost and mess associated with maintaining sprinklers at installation sites.

For expository purposes, the term "horizontal" as used herein is defined as a plane parallel to the plane or surface of the floor of the area in which the system being described is used or the method being described is performed, regardless of its orientation. The term "floor" can be interchanged with the term "ground." The term "vertical" refers to a direction perpendicular to the horizontal as just defined. Terms such as "above," "below," "bottom," "top," "side," "higher," "lower," "upper," "over," and "under," are defined with respect to the horizontal plane. In applications where a sprinkler is installed in level or substantially level ground, the terms "upstream" and "lower" are often analogous and the terms "downstream" and "upper" are often analogous.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

The terms "approximately," "about," "generally," and "substantially" as used herein represent an amount close to the stated amount that still performs a desired function or achieves a desired result. For example, the terms "approximately," "about," "generally," and "substantially" may refer to an amount that is within less than 10% of the stated amount.

While several embodiments of a rotor-type sprinkler have been disclosed with a built-in pressure regulator adjacent its inlet, it will be understood by those skilled in the disclosed sprinklers can be modified in both arrangement and detail. For example, other forms of reversing mechanism could be used such as a plate with tangential fluid ports and a port shifting mechanism, or a combination planetary gear reduction and reversing mechanism such as that disclosed in U.S. Pat. No. 7,677,469 of Michael L. Clark, the entire disclosure of which is hereby incorporated by reference. The sprinklers 10 and 310 could be a fixed spray type sprinkler with no gear reduction at all. One or more of the components of the sprinklers 10, 210 and 310 can be made of injection molded plastic parts, metal shafts, steel springs and/or seals made of a suitable elastomeric material. The sod cup may be formed with one material. The sod cup may attach directly to the riser, the nozzle, or the nozzle turret without the need for an adapter plate.

What is claimed is:

1. An irrigation sprinkler comprising:
   an outer case having an inlet end and an outlet end;
   a riser positioned at least partially within the outer case and having an upstream end and a downstream end, the riser configured to transition between a retracted position and an extended position wherein the downstream end is positioned on a side of the outlet end of the outer case opposite the inlet end of the outer case when the riser is in the extended position, the downstream end of the riser supporting a first engagement feature; and a cup assembly comprising a second engagement feature, the cup assembly configured to hold organic or artificial turf therein;

wherein:

one of the first engagement feature or the second engagement feature is a plurality of apertures, and wherein the other one of the first engagement feature or the second engagement feature is a plurality of lock arms;

the plurality of lock arms are configured to be inserted through the plurality of apertures and transition to a locked configuration when the cup assembly is rotated with respect to the riser after the plurality of lock arms are inserted through the plurality of apertures; and the cup assembly is configured to be removed from the riser without emptying the turf therefrom.

2. The irrigation sprinkler of claim 1, further comprising an adapter configured to releasably connect to the downstream end of the riser, one of the first engagement feature or the second engagement feature being disposed on the adapter.

3. The irrigation sprinkler of claim 2, wherein the cup assembly is configured to connect to the adapter.

4. The irrigation sprinkler of claim 1, wherein the downstream end of the riser comprises a nozzle turret configured to rotate with respect to the outer case.

5. The irrigation sprinkler of claim 1, wherein the cup assembly comprises a cup base and a cup portion, and wherein one of the first engagement feature or the second engagement feature is disposed on the cup base.

6. The irrigation sprinkler of claim 5, wherein the cup base is integrally formed with the cup portion.

7. The irrigation sprinkler of claim 5, wherein the cup base is formed separately from the cup portion and attached thereto.

8. The irrigation sprinkler of claim 1, further comprising a sleeve surrounding at least a portion of the cup assembly when the riser is in the retracted position.

9. An irrigation sprinkler comprising:

an outer case having an inlet end and an outlet end;

a riser positioned at least partially within the outer case and having an upstream end and a downstream end, the riser configured to axially translate with respect to the outer case between a retracted position and an extended position;

an end cap removably attached to the outlet end to confine the riser within the outer case;

an adapter connected to the downstream end of the riser and comprising a plurality of apertures; and a cup assembly comprising a plurality of lock arms configured to be inserted through the plurality of apertures and transition to a locked configuration when the cup assembly is rotated with respect to the adapter after the plurality of lock arms are inserted through the plurality of apertures, the cup assembly configured to hold organic or artificial turf;

wherein the cup assembly is configured to attach and detach from the adapter without requiring removal of the organic or artificial turf from the cup assembly.

10. The irrigation sprinkler of claim 9, wherein the plurality of apertures are L-shaped.

11. The irrigation sprinkler of claim 9, wherein the adapter further includes one or more protrusions configured to engage with the plurality of lock arms.

12. The irrigation sprinkler of claim 9, wherein the cup assembly includes a cup portion and a base portion, wherein the cup portion has a hardness of less than 95 Shore A.

13. The irrigation sprinkler of claim 9, further comprising a sleeve connected to the end cap, wherein the sleeve surrounds at least a portion of the cup assembly when the riser is in the retracted position.

14. The irrigation sprinkler of claim 13, wherein the sleeve is removable from the end cap.

15. The irrigation sprinkler of claim 13, wherein the sleeve is integrally formed with the end cap.

16. The irrigation sprinkler of claim 9, wherein the downstream end of the riser comprises a nozzle turret configured to rotate with respect to the outer case.

17. The irrigation sprinkler of claim 9, wherein the adapter is configured to connect to the downstream end of the riser using one or more fasteners.

18. The irrigation sprinkler of claim 13, wherein the sleeve has a hardness of less than 95 Shore A.

19. An irrigation sprinkler comprising:

an outer case having:

an inlet end configured to fluidly connect to a source of water; and an outlet end;

a riser positioned at least partially within the outer case and configured to transition between a retracted position and an extended position, the riser having:

an upstream end; and a downstream end supporting a first engagement feature;

a cup assembly comprising a second engagement feature, the cup assembly configured to hold organic or artificial turf; and a sleeve connected to the outer case and surrounding at least a portion of the cup assembly when the riser is in the retracted position;

wherein:

one of the first engagement feature or the second engagement feature is a plurality of apertures, and wherein the other one of the first engagement feature or the second engagement feature is a plurality of lock arms;

the plurality of lock arms configured to be inserted through the plurality of apertures and transition to a locked configuration when the cup assembly is rotated with respect to the riser after the plurality of lock arms are inserted through the plurality of apertures;

the downstream end of the riser is positioned on a side of the outlet end of the outer case opposite the inlet end of the outer case when the riser is in the extended position;

the cup assembly is configured to be removed from the riser without removing the turf therefrom; and the cup assembly is configured to be removable from the riser without removal of the sleeve.

20. The irrigation sprinkler of claim 19, further comprising an adapter, wherein one of the first engagement feature or the second engagement feature is disposed on the adapter.

* * * * *